United States Patent
Lin et al.

(10) Patent No.: US 11,489,873 B2
(45) Date of Patent: Nov. 1, 2022

(54) SECURITY POLICY DEPLOYMENT METHOD AND APPARATUS

(71) Applicant: Huawei Technologies Co., Ltd., Shenzhen (CN)

(72) Inventors: Qingchun Lin, Beijing (CN); Tao Jin, Shenzhen (CN); Jiangsheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/359,753

(22) Filed: Mar. 20, 2019

(65) Prior Publication Data

US 2019/0222611 A1 Jul. 18, 2019

Related U.S. Application Data

(63) Continuation of application No. PCT/CN2016/099455, filed on Sep. 20, 2016.

(51) Int. Cl.
*H04L 9/40* (2022.01)
*H04L 12/66* (2006.01)
(Continued)

(52) U.S. Cl.
CPC .......... *H04L 63/20* (2013.01); *G06F 9/45558* (2013.01); *H04L 12/66* (2013.01);
(Continued)

(58) Field of Classification Search
CPC ......... H04L 63/20; H04L 29/02; H04L 12/66; G06F 9/45558; G06F 2009/45587; G06F 2009/45595
See application file for complete search history.

(56) References Cited

U.S. PATENT DOCUMENTS

2016/0149774 A1* 5/2016 Chastain ............. G06F 9/45558
370/241
2016/0182567 A1* 6/2016 Sood ....................... H04L 63/10
726/1
(Continued)

FOREIGN PATENT DOCUMENTS

CN 105376246 A 3/2016
CN 105847237 A 8/2016
(Continued)

OTHER PUBLICATIONS

Network Functions Virtualisation—Introductory White Paper Don Clarke et al., "Network Functions Virtualisation—An Introduction, Benefits, Enablers, Challenges and Call for Action",dated Oct. 22-24, 2012 ,total 16 pages.
(Continued)

*Primary Examiner* — James R Turchen
(74) *Attorney, Agent, or Firm* — Leydig, Voit & Mayer, Ltd.

(57) ABSTRACT

A security policy deployment method and apparatus are provided, and the method includes: when a lifecycle state of a virtualized network function VNF changes, generating, by a management network element, a security policy of the VNF, where the security policy of the VNF is used to perform access control on the VNF; and sending, by the management network element, the security policy of the VNF to a control device. The management network element is a network element configured to perform lifecycle management on the VNF. By using the method or apparatus provided in embodiments of this application, the security policy of the VNF can be adjusted in time when the lifecycle state of the VNF changes, thereby greatly reducing a possibility that a bug occurs in the security policy of the VNF because the VNF changes.

9 Claims, 2 Drawing Sheets

---

When a lifecycle state of a VNF changes, a management network element generates a security policy of the VNF, where the security policy of the VNF is used to perform access control on the VNF — 201

The management network element sends the security policy of the VNF to a control device, where the control device is configured to implement access control on the VNF — 202

(51) Int. Cl.
   *G06F 9/455*      (2018.01)
   *H04L 65/00*      (2022.01)
(52) U.S. Cl.
   CPC .... *H04L 65/00* (2013.01); *G06F 2009/45587* (2013.01); *G06F 2009/45595* (2013.01)

(56) References Cited

U.S. PATENT DOCUMENTS

| | | | |
|---|---|---|---|
| 2016/0226913 A1* | 8/2016 | Sood | H04L 63/1425 |
| 2016/0337329 A1* | 11/2016 | Sood | H04L 63/06 |
| 2016/0366014 A1* | 12/2016 | Koo | H04L 12/4641 |
| 2016/0373474 A1* | 12/2016 | Sood | G06F 21/50 |
| 2017/0048165 A1* | 2/2017 | Yu | H04L 41/044 |
| 2017/0048200 A1* | 2/2017 | Chastain | H04W 12/088 |
| 2017/0214694 A1* | 7/2017 | Yan | H04L 63/0853 |
| 2017/0250870 A1 | 8/2017 | Zhao | |
| 2017/0329639 A1* | 11/2017 | Morper | G06F 9/5038 |
| 2017/0353494 A1* | 12/2017 | Krinos | H04L 63/10 |
| 2018/0004576 A1* | 1/2018 | Gokurakuji | G06F 9/5077 |
| 2018/0026992 A1* | 1/2018 | Paczkowski | H04L 67/51 726/4 |
| 2018/0034781 A1* | 2/2018 | Jaeger | G06F 9/45558 |
| 2018/0213402 A1* | 7/2018 | Harris | H04W 12/08 |
| 2018/0316730 A1* | 11/2018 | Schaefer | H04L 41/0883 |
| 2019/0104442 A1* | 4/2019 | Witzel | H04W 36/0072 |
| 2019/0199760 A1* | 6/2019 | Arauz-Rosado | H04L 61/5007 |

FOREIGN PATENT DOCUMENTS

| | | |
|---|---|---|
| WO | 2016079046 A1 | 5/2016 |
| WO | 2016082143 A1 | 6/2016 |
| WO | 2016105770 A1 | 6/2016 |

OTHER PUBLICATIONS

"Network Functions Virtualisation (NFV); Management and Orchestration," ETSI GS NFV-MAN 001 V1.1.1, pp. 1-184, European Telecommunications Standards Institute, Sophia Antipolis, France (Dec. 2014).

* cited by examiner

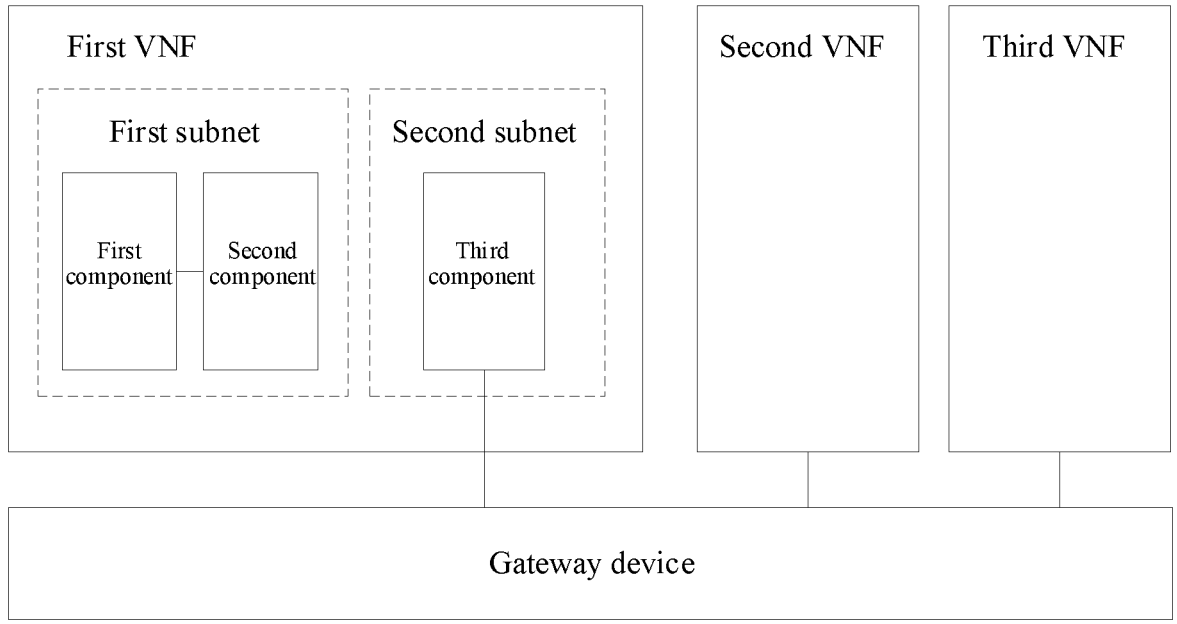

FIG. 1

When a lifecycle state of a VNF changes, a management network element generates a security policy of the VNF, where the security policy of the VNF is used to perform access control on the VNF — 201

The management network element sends the security policy of the VNF to a control device, where the control device is configured to implement access control on the VNF — 202

FIG. 2

When a lifecycle state of a VNF changes, a management network element generates a first security policy — 301

The management network element sends the first security policy to the VNF — 302

SECURITY POLICY DEPLOYMENT METHOD AND APPARATUS

CROSS-REFERENCE TO RELATED APPLICATIONS

This application is a continuation of International Application No. PCT/CN2016/099455, filed on Sep. 20, 2016, the disclosure of which is hereby incorporated by reference in its entirety.

TECHNICAL FIELD

Embodiments of this application relate to the network field, and in particular, to a security policy deployment method and apparatus.

BACKGROUND

A conventional network system is a system that interconnects a plurality of network devices with different geographic locations and independent functions to share resources or transfer information. After deployment, network devices included in the conventional network system and a network connection relationship between the network devices are relatively fixed. Consequently, it is extremely difficult to adjust a network service (NS) provided by the conventional network system.

For ease of NS adjustment based on an actual requirement, increasingly more users start to use a network functions virtualization (NFV) technology and a network functions virtualization infrastructure (NFVI) to build a network system. In the network system built by using the NFV technology, a virtualized network function manager (VNFM) may create, adjust, or terminate a corresponding virtualized network function (VNF) based on an NS that needs to be implemented by the network system, and a network functions virtualization orchestrator (NFVO) may rearrange a VNF to implement NS adjustment.

To ensure secure and stable running of a network system, a corresponding security policy needs to be configured for a network device in the conventional network system, and the network device may perform access control based on the security policy. The network devices included in the conventional network and the network connection relationship between the network devices are relatively fixed. Therefore, when a security policy is configured for a network device in the conventional network system, a skilled person may consider designing a corresponding security policy for each network device based on a network device type and a network device connection relationship in planning and design stages of the network system. Then a skilled person manually delivers the security policies to corresponding network devices when each network device is installed and deployed, so as to implement security policy configuration of the network devices.

In the network system built by using the NFV technology, a corresponding security policy also needs to be configured for each VNF and NS. However, in the network system built by using the NFV technology, each VNF has a specific lifecycle. In a lifecycle management process, it is determined that the VNF may continually change. For example, a component included in the VNF, a connection relationship between components included in the VNF, and a connection relationship between VNFs may continually change in the lifecycle management process.

If a skilled person manually configures, in a security policy configuration manner in the conventional network system, a security policy for a VNF in the network system built by using the NFV technology, the skilled person probably cannot find a change of the VNF in time, or the skilled person probably cannot adjust the security policy of the VNF in time after the VNF changes. Consequently, a bug occurs in the security policy of the VNF, and security of the network system is affected.

SUMMARY

This application provides a security policy deployment method and apparatus, so as to resolve a problem that a bug easily occurs in a security policy of a VNF in a network system when the security policy is configured for the VNF in a conventional manner.

According to a first aspect, this application provides a security policy deployment method, and the method includes: when a lifecycle state of a virtualized network function VNF changes, generating, by a management network element, a security policy of the VNF, where the security policy of the VNF is used to perform access control on the VNF; and sending, by the management network element, the security policy of the VNF to a control device, where the control device is configured to implement access control on the VNF. The management network element may include a VNFM or an NFVO, and the control device may include the VNF or a gateway device configured to provide the VNF with network access. By using the technical solution provided in this aspect, the management network element can adjust the security policy of the VNF in time when the lifecycle state of the VNF changes, thereby greatly reducing a possibility that a bug occurs in the security policy of the VNF because the VNF changes.

With reference to the first aspect, in a first possible implementation of the first aspect, when the VNF is deployed on at least two virtual components, the security policy includes a first security policy, and the first security policy is used to perform access control or security isolation between the at least two virtual components. By using the technical solution provided in this implementation, the management network element can adjust the security policy of the VNF in time when the VNF changes, thereby reducing a possibility that a bug occurs in the security policy of the VNF because the VNF changes.

With reference to the first possible implementation of the first aspect, in a second possible implementation of the first aspect, the generating, by a management network element, a security policy of the VNF includes: determining, by the management network element, a network isolation requirement of the virtual component based on a function that needs to be implemented by the virtual component, and generating the first security policy that matches the network isolation requirement of the virtual component; or determining, by the management network element, an access control requirement of the virtual component based on a function that needs to be implemented by the virtual component, and generating the first security policy that matches the access control requirement; or obtaining, by the management network element, configuration information of the VNF, and selecting a security policy that matches the configuration information from preset alternative security policies, to serve as the first security policy. By using the technical solution provided in this implementation, the management network element can accurately generate the security policy required by the VNF after the lifecycle state changes, thereby reducing a possibility that a bug occurs in the security policy of the VNF.

With reference to the first possible implementation of the first aspect or the second possible implementation of the first aspect, in a third possible implementation of the first aspect, the control device is the VNF, and the sending, by the management network element, the security policy of the VNF to a control device includes: sending, by the management network element, the first security policy to the VNF by using a virtualized infrastructure manager VIM; or sending, by the management network element, the first security policy to the VNF by using an element management system EMS. By using the technical solution provided in this implementation, the management network element can quickly implement security policy deployment, thereby reducing a possibility that a bug occurs in the security policy of the VNF.

With reference to any one of the first aspect, or the first to the third possible implementations of the first aspect, in a fourth possible implementation of the first aspect, the security policy includes a second security policy, the second security policy is used to perform access control or security isolation between the VNF and an associated network element, and the associated network element is a network element other than the VNF in a network to which the VNF belongs. By using the technical solution provided in this implementation, the management network element can adjust the security policy of the VNF in time when a relationship between the VNF and the associated network element changes, thereby reducing a possibility that a bug occurs in the security policy of the VNF because the relationship between the VNF and the associated network element changes.

With reference to the fourth possible implementation of the first aspect, in a fifth possible implementation of the first aspect, that the management network element generates the second security policy includes: determining, by the management network element, a network isolation requirement of the VNF based on a function that needs to be implemented by the VNF, and generating the second security policy that matches the network isolation requirement of the VNF; or determining, by the management network element, an access control requirement of the VNF based on a function that needs to be implemented by the VNF, and generating the second security policy that matches the access control requirement. By using the technical solution provided in this implementation, the management network element can accurately generate the security policy required by the VNF after the lifecycle state changes, thereby reducing a possibility that a bug occurs in the security policy of the VNF.

With reference to the fourth or the fifth possible implementation of the first aspect, in a sixth possible implementation of the first aspect, the control device is a gateway device that provides the VNF with a network service, and the sending, by the management network element, the security policy of the VNF to a control device includes: sending, by the management network element, the second security policy to the gateway device by using the VIM; or sending, by the management network element, the second security policy to the gateway device by using the EMS. By using the technical solution provided in this implementation, the management network element can quickly implement security policy deployment, thereby reducing a possibility that a bug occurs in the security policy of the VNF.

According to a second aspect, this application further provides a security policy deployment apparatus, and the apparatus may include unit modules configured to perform the method steps in the first aspect and the implementations of the first aspect.

According to a third aspect, this application further provides another management network element, and the management network element may be configured to perform the method steps in the first aspect or the implementations of the first aspect. The management network element may be a VNFM, an NFVO, a VIM, or another network element.

By using the method or apparatus provided in embodiments of this application, the security policy of the VNF can be adjusted in time when the lifecycle state of the VNF changes, thereby greatly reducing a possibility that a bug occurs in the security policy of the VNF because the VNF changes.

BRIEF DESCRIPTION OF DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

FIG. 1 is a schematic structural diagram of a network system according to this application;

FIG. 2 is a schematic flowchart of an embodiment of a security policy configuration method according to this application;

FIG. 3 is a schematic flowchart of another embodiment of a security policy configuration method according to this application;

DESCRIPTION OF EMBODIMENTS

Figure 4:
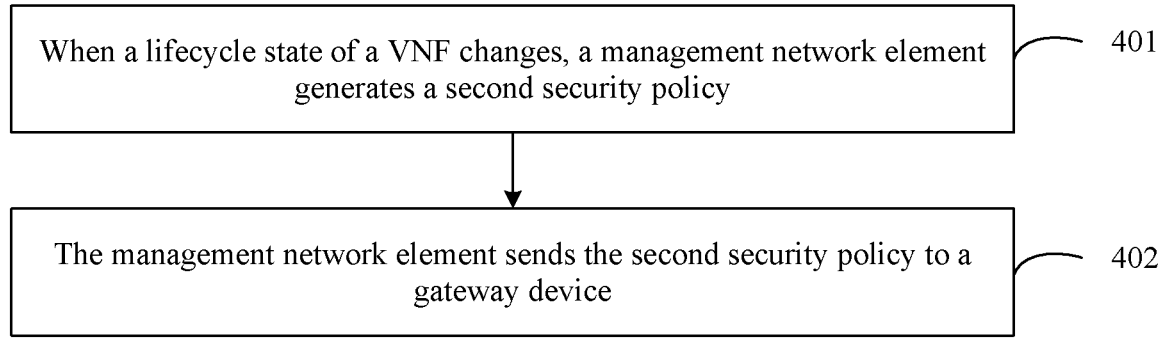
FIG. 4 is a schematic flowchart of another embodiment of a security policy configuration method according to this application.

A network system in the embodiments of this application may be a network system built by using a network functions virtualization infrastructure (NFVI) managed by a device such as a virtualized infrastructure manager (VIM).

In the embodiments of this application, a virtualized network function manager (VNFM) may generate a specific quantity of virtualized network functions (VNF) by using the NFVI, and perform lifecycle management on the VNF. A network functions virtualization orchestrator (NFVO) may deploy, operate, manage, and coordinate the VNF and a corresponding NFVI by using the VNFM, so as to implement a specific network service (NS).

In the embodiments of this application, the VNF may be deployed on one or more components, and the components may independently or cooperatively implement a specific function. For example, the components may independently or cooperatively implement functions such as data processing and data storage, so that the VNF may implement a specific network service (NS). Generally, each NS may be implemented by at least one VNF, and a same VNF may be used to implement different NSs. Therefore, it may be considered that each NS includes at least one VNF or each NS is formed by the at least one VNF. The component may be an entity component, such as a server; or may be a virtual component, such as a virtual machine (VM).

In the embodiments of this application, a change of a lifecycle state of the VNF may include: VNF instantiation, VNF scale-in, VNF scale-out, VNF termination, and the like. The VNF may be created, or may be changed, or may be rearranged. The VNF instantiation may indicate that the VNF is created. To be specific, the VNF is created by the VNFM by using the NFVI. The VNF scale-in and the VNF scale-out indicate that the VNF is changed. To be specific, components in the VNF are increased, reduced, or adjusted; or an NS that needs to be implemented by the VNF is adjusted; or a relationship between the VNF and another network element is adjusted. The component in the VNF may be a component configured to deploy the VNF.

Referring to FIG. 1, FIG. 1 is a schematic structural diagram of an embodiment of a network system according to this application.

As shown in FIG. 1, the network system may include a first VNF, a second VNF, and a third VNF, and all the first VNF, the second VNF, and the third VNF are connected to a gateway device. The gateway device is configured to provide the VNFs with a network service, and may be a virtual gateway device or an entity gateway device. For example, the network service may include a virtual local area network (VLAN) service, a virtual private network (VPN) service, or a firewall service. The virtual gateway device may generally include a virtual switch, a virtual router, a virtual firewall, or the like.

The VNF in the network system may be deployed on a plurality of virtual devices or entity devices. For example, the VNF in FIG. 1 is deployed on a first component, a second component, and a third component. The first component and the second component cooperate to implement an internal function of the VNF, and the third component is configured to provide an external service. Therefore, the first component and the second component may form a first subnet, and the third component may form a second subnet. All of the first component, the second component, and the third component may be virtual components; or some of the first component, the second component, and the third component may be virtual components, and the other may be entity components.

It should be noted that the network system may further include more or fewer VNFs and gateway devices. In addition to the VNF and the gateway device, the network system may further include another network element such as a management network element (VIM), or an element management system (EMS). The management network element may be any network element that can learn of a lifecycle state change of a VNF. Generally, the management network element may be a VNFM, an NFVO, a VIM, or another network element.

The following further describes a security policy deployment method in this application with reference to the accompanying drawings.

Referring to FIG. 2, FIG. 2 is a flowchart of an embodiment of a security policy deployment method according to this application.

Step 201: When a lifecycle state of a VNF changes, a management network element generates a security policy of the VNF, where the security policy of the VNF is used to perform access control on the VNF.

The management network element may monitor the lifecycle state of the VNF, or may perform lifecycle management on the VNF.

Specifically, the management network element may perform lifecycle management on the VNF, so as to change the lifecycle state of the VNF. For example, when the management network element creates a first VNF by using an NFVI, or the management network element replaces a fourth component in the first VNF with a third component, a lifecycle state of the first VNF changes. For another example, when the management network element replaces a second VNF with a third VNF to be served by a first VNF, all lifecycle states of the first VNF, the second VNF, and the third VNF change.

It should be noted that when the management network element performs lifecycle management on the VNF, not only the lifecycle state of the VNF changes, but also a security policy requirement of the VNF changes. Therefore, the management network element may generate the security policy of the VNF when the lifecycle state of the VNF changes. The security policy of the VNF may include various policies and rules used to prevent the VNF from various network attacks.

For example, when the management network element replaces the fourth component in the first VNF with the third component, the security policy requirement of the VNF changes because the components in the VNF change. Therefore, the management network element may generate the security policy of the VNF when the lifecycle state of the VNF changes, so as to meet the security policy requirement of the VNF.

The security policy of the VNF may include a first security policy and/or a second security policy. The first security policy is used to perform, when the VNF is deployed on at least two components, access control or security isolation between the components. The second security policy is used to perform access control or security isolation between the VNF and an associated network element. The associated network element is a network element other than the VNF in a network to which the VNF belongs.

For example, when composition of the network system is shown in FIG. 1, the first security policy is used to perform access control or security isolation between the first component, the second component, and the third component, and the second security policy is used to perform access control or security isolation between the first VNF, the second VNF, and the third VNF. The first security policy may include an access control list (ACL) or the like. The second security policy may include a layer-2 VLAN policy based on an open systems interconnection (OSI) model, a layer-3 VPN policy based on an OSI model, an access control policy used to control access between a VNF and another network element, or the like.

Step 202: The management network element sends the security policy of the VNF to a control device, where the control device is a network element configured to implement access control on the VNF.

The control device may include the VNF or a gateway device. The gateway device is a gateway device that provides the VNF with a network service, namely, a serving gateway of the VNF. For example, when a structure of the network system is shown in FIG. 1 and the lifecycle state of the first VNF changes, the control device may include the first VNF and the gateway device.

The management network element may send the security policy of the VNF to a corresponding control device in different ways. For example, when the security policy of the VNF includes the first security policy, the management network element may send the first security policy to the VNF after generating the first security policy; or when the security policy of the VNF includes the second security policy, the management network element may send the second security policy to the gateway device after generating the second security policy.

By using the technical solution provided in this embodiment, the management network element can adjust the security policy of the VNF in time when the lifecycle state of the VNF changes, thereby greatly reducing a possibility that a bug occurs in the security policy of the VNF because the VNF changes.

The change of the lifecycle state of the VNF may include the following cases: The component in the VNF changes; or a service provided by the VNF or an object served by the VNF changes; or the like. Different changes of the lifecycle state of the VNF result in different specific security policy deployment implementations in this application. With reference to other accompanying drawings, the following further describes the security policy deployment method in this application by using two example cases in which the security policy of the VNF includes the first security policy and the security policy includes the second security policy.

Referring to FIG. 3, FIG. 3 is a schematic flowchart of another embodiment of a security policy deployment method according to this application. As shown in FIG. 3, this embodiment may include the following steps.

Step 301: When a lifecycle state of a VNF changes, a management network element generates a first security policy.

The change of the lifecycle state of the VNF may include only a component change in the VNF. The component change in the VNF may include the following cases: A function that needs to be implemented by the component changes; or a component used to deploy the VNF changes; or the like. FIG. 1 is used as an example. The component change in the first VNF may include the following cases: A fourth component is replaced with a third component, or functions that need to be implemented by a first component and a second component are exchanged, or the like.

A security policy requirement of the VNF changes because of the component change in the VNF. To meet a changed security policy requirement, the management network element may generate the first security policy after the lifecycle state of the VNF changes. The first security policy may include content such as a first network isolation policy and/or a first access control policy. The first network isolation policy implements network isolation between components in the VNF, and the first access control policy is used to perform access control on an access request whose access target is the component.

The management network element may determine a network isolation requirement of the component based on a function that needs to be implemented by the component in the VNF; and then generate the first network isolation policy that matches the network isolation requirement of the component. Alternatively, the management network element may determine an access control requirement of the component based on a function that needs to be implemented by the component in the VNF; and then generate the first access control policy that matches the access control requirement of the component. It should be noted herein that the management network element may generate only the first access control policy; or the management network element may generate only the first network isolation policy; or the management network element may generate both the first access control policy and the first network isolation policy. Both the first access control policy and the first network isolation policy are the first security policy.

FIG. 1 is used as an example. If the first component and the second component cooperate to implement an internal function of the first VNF, and the third component is used to provide an external service, the third component needs to be isolated from the other two components, so as to form a first subnet and a second subnet that are isolated from each other inside the first VNF. The first subnet may include the first component and the second component, and the second subnet may accordingly include only the third component. Therefore, the first security policy may include a first isolation policy used to isolate the third component from the other two components to form different subnets.

For another example, if the first subnet allows the first component to perform data transmission with the second component only through a first port, and the second subnet allows the third component to perform data transmission with another network element only through a second port, the access control policy may include a first ACL and a second ACL. The first ACL is used to control traffic between the first component and the second component to be transmitted only through the first port, and the second ACL is used to control the third component to perform data transmission with the another network element only through the second port.

The network isolation requirement and/or the access control requirement between the components may be determined based on first configuration information. The first configuration information may include all or a part of the following information: an IP address configured on an internal interface or an external interface of the VNF, a service provided on the internal interface or the external interface, and a connection relationship of the internal interface or the external interface, or the like.

In actual use, the management network element usually needs to perform lifecycle management on the VNF based on configuration information. VNFs of a same type usually correspond to same configuration information, and usually require a same first security policy. Therefore, the management network element or another network element may pre-generate alternative security policies corresponding to various types of configuration information. When the lifecycle state of the VNF changes, the management network element obtains configuration information of the VNF, and then selects a security policy that matches the configuration information from the preset alternative security policies, to serve as the first security policy.

Step 302: The management network element sends the first security policy to the VNF.

Because the management network element may not be directly connected to the VNF through a network interface or an internal interface, the management network element may send the first security policy to a VIM after generating the first security policy, and then the VIM sends the first security policy to the VNF.

Alternatively, when the network system includes an element management system (EMS), the management network element may send the first security policy to the EMS, and then the EMS sends the first security policy to the VNF, so as to implement deployment of the first security policy. The EMS may be configured to manage each network element.

By using the technical solution provided in this embodiment, the management network element can adjust the security policy of the VNF in time when the VNF changes, thereby reducing a possibility that a bug occurs in the security policy of the VNF because the VNF changes.

Referring to FIG. 4, FIG. 4 is a schematic flowchart of another embodiment of a security policy deployment method according to this application. As shown in FIG. 4, this embodiment may include the following steps.

Step 401: When a lifecycle state of a VNF changes, a management network element generates a second security policy.

The change of the lifecycle state of the VNF may include the following cases: Only a service provided by the VNF or an object served by the VNF changes, or the like. FIG. 1 is used as an example. A change of a lifecycle state of a first VNF may include the following cases: A service provided by the first VNF changes, or the first VNF is served by a third VNF, instead of a second VNF, or the like.

A security policy requirement of the VNF changes because the service provided by the VNF or the object served by the VNF changes. To meet a changed security policy requirement, the management network element may generate the second security policy after the lifecycle state of the VNF changes. The second security policy may include content such as a second network isolation policy and/or a second access control policy. The second network isolation policy implements network isolation between the VNF and an associated network element, and the second access control policy is used to perform access control on an access request whose access target is the VNF.

The management network element may determine a network isolation requirement of the VNF based on a function that needs to be implemented by the VNF; and then generate the second security policy that matches the network isolation requirement of the VNF. Alternatively, the management network element may determine an access control requirement of the VNF based on a function that needs to be implemented by the VNF; and then generate the second security policy that matches the access control requirement. It should be noted herein that the management network element may generate only the second access control policy; or the management network element may generate only the second network isolation policy; or the management network element may generate both the second access control policy and the second network isolation policy. Both the second access control policy and the second network isolation policy are the second security policy.

For example, when a structure of the network system is shown in FIG. 1, if only the second VNF is allowed to communicate with the first VNF to ensure security of the first VNF, the second security policy needs to include a third ACL. The third ACL is used to control the first VNF to perform data transmission with only the second VNF. Alternatively, the management network element may generate a VLAN policy or a VPN policy to allow only the second VNF to communicate with the first VNF.

Step 402: The management network element sends the second security policy to a gateway device.

Because isolation or access control of the VNF usually needs to be implemented by the gateway device, the management network element may send the second security policy to the gateway device after generating the second security policy. The gateway device may include a network device that provides the VNF with a network service, and there may be one or more network devices. When there are at least two gateway devices, different types of provided network services result in different types of gateway devices.

Because the management network element may not be directly connected to the gateway device, the management network element may send the second security policy to a VIM after generating the second security policy, and then the VIM sends the second security policy to the gateway device.

Alternatively, when the network system includes an EMS, the management network element may send the second security policy to the EMS, and then the EMS sends the second security policy to the gateway device, so as to implement deployment of the second security policy. The EMS may be configured to manage each network element.

By using the technical solution provided in this embodiment, the management network element can adjust the security policy of the VNF in time when the lifecycle state of the VNF changes, thereby greatly reducing a possibility that a bug occurs in the security policy of the VNF because the VNF changes.

It should be noted herein that, when the lifecycle state of the VNF changes, the management network element may only need to generate the first security policy; or may only need to generate the second security policy; or may need to generate both the first security policy and the second security policy. When both the first security policy and the second security policy need to be generated, the two policies may be independently generated, and a generation sequence is not limited in this application.

By using the technical solution provided in this implementation, the management network element can adjust the security policy of the VNF in time when a relationship between the VNF and the associated network element changes, thereby reducing a possibility that a bug occurs in the security policy of the VNF because the relationship between the VNF and the associated network element changes.

Figure 5:
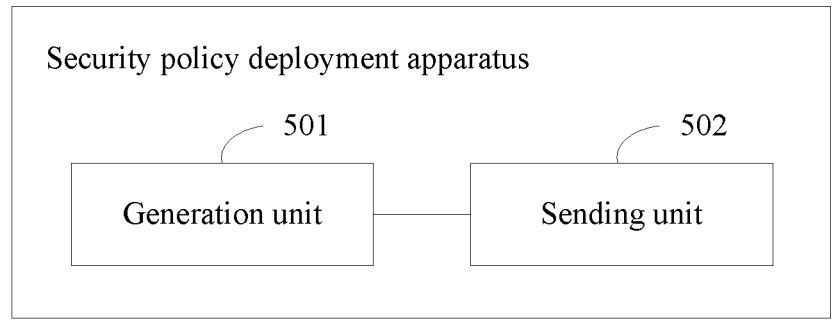
FIG. 5 is a schematic structural diagram of an embodiment of a security policy configuration apparatus according to this application.

Referring to FIG. 5, FIG. 5 is a schematic structural diagram of an embodiment of a security policy deployment apparatus according to this application. The apparatus may be the management network element in the foregoing embodiments or a part of the management network element.

As shown in FIG. 5, the security policy deployment apparatus may include a generation unit 501 and a sending unit 502.

The generation unit 501 is configured to: when a lifecycle state of a virtualized network function VNF changes, generate a security policy of the VNF. The security policy of the VNF is used to perform access control on the VNF. The sending unit 502 is configured to send the security policy of the VNF to a control device.

Optionally, the generation unit 501 is specifically configured to generate a first security policy when the VNF includes at least two virtual components. The first security policy is used to perform access control or security isolation between the virtual components.

Optionally, the generation unit 501 is specifically configured to determine a network isolation requirement of the virtual component based on a function that needs to be implemented by the virtual component, and generate the first security policy that matches the network isolation requirement of the virtual component; or determine an access control requirement of the virtual component based on a function that needs to be implemented by the virtual component, and generate the first security policy that matches the access control requirement; or select a security policy that matches configuration information of the VNF from preset alternative security policies, to serve as the first security policy.

Optionally, the sending unit 502 is specifically configured to: send the first security policy to the VNF by using a virtualized infrastructure manager VIM; or send the first security policy to the VNF by using an element management system EMS.

Optionally, the generation unit 501 is specifically configured to generate a second security policy. The second security policy is used to perform access control or security isolation between the VNF and an associated network element. The associated network element is a network element other than the VNF in a network to which the VNF belongs.

Optionally, the generation unit 501 is specifically configured to determine a network isolation requirement of the VNF based on a function that needs to be implemented by the VNF, and generate the second security policy that matches the network isolation requirement of the VNF; or determine an access control requirement of the VNF based on a function that needs to be implemented by the VNF, and generate the second security policy that matches the access control requirement.

Optionally, the sending unit 502 is specifically configured to: send, by using a VIM, the second security policy to a gateway device configured to provide the VNF with a network service; or send the second security policy to a gateway device by using an EMS.

Figure 6:
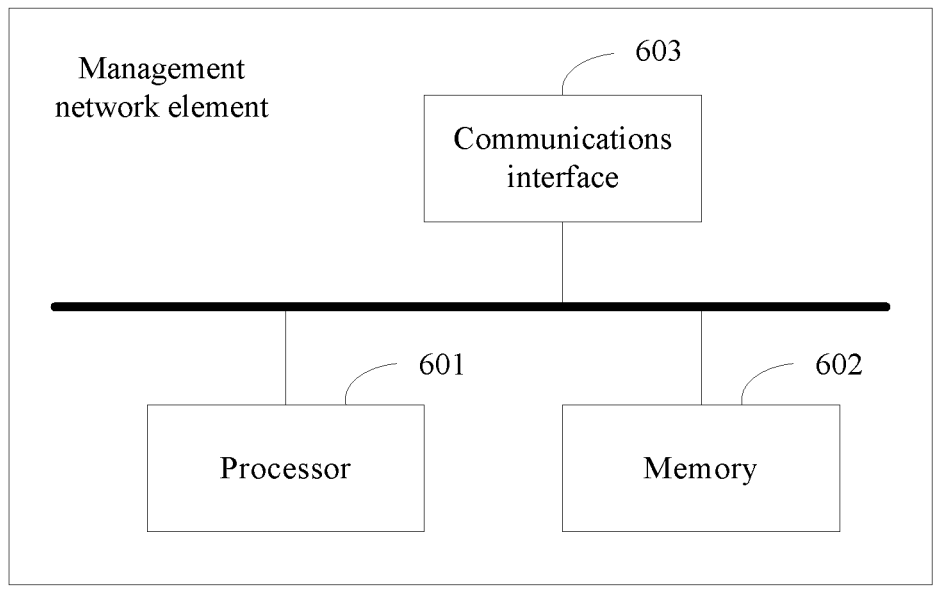
FIG. 6 is a schematic structural diagram of an embodiment of a management network element according to this application.

Referring to FIG. 6, FIG. 6 is a schematic structural diagram of an embodiment of a management network element according to this application. The management network element may be an NFVO or a VNFM.

As shown in FIG. 6, the management network element may include a processor 601, a memory 602, and a communications interface 603.

The processor 601 is a control center of the management network element and is connected to each part of the entire management network element by using various interfaces and lines. The processor performs various functions and/or data processing of the management network element by running or executing a software program and/or a module stored in the memory and by invoking data stored in the memory. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof. In this embodiment of this application, the management element may implement all or a part of the steps of the security policy configuration method in the foregoing embodiments by reading the data from the memory 602 or invoking the communications interface 603.

The memory 602 may include a volatile memory, such as a random access memory (RAM); or may include a non-volatile memory, such as a flash memory, a hard disk drive (HDD), or a solid-state drive (SSD). The memory may alternatively include a combination of the foregoing types of memories. The memory may store a program or code, and the processor in the management network element may implement a function of the management network element by executing the program or code.

The communications interface 603 may be configured to receive or send data. The communications interface may send data to a terminal device or another management network element under control of the processor; or the communications interface receives, under control of the processor, data sent by a terminal device or another management network element.

In this application, the processor 601 may be configured to: when a lifecycle state of a virtualized network function VNF changes, generate a security policy of the VNF. The security policy of the VNF is used to perform access control on the VNF. The communications interface 603 may be configured to send the security policy of the VNF to a control device.

Optionally, the processor 601 may be further configured to generate a first security policy when the VNF includes at least two virtual components, where the first security policy is used to perform access control or security isolation between the virtual components.

Optionally, the processor 601 may be further configured to determine a network isolation requirement of the virtual component based on a function that needs to be implemented by the virtual component, and generate the first security policy that matches the network isolation requirement of the virtual component; or determine an access control requirement of the virtual component based on a function that needs to be implemented by the virtual component, and generate the first security policy that matches the access control requirement; or select a security policy that matches configuration information of the VNF from preset alternative security policies, to serve as the first security policy.

Optionally, the communications interface 603 may be further configured to: send the first security policy to the VNF by using a VIM; or send the first security policy to the VNF by using an EMS.

Optionally, the processor 601 may be further configured to generate a second security policy. The second security policy is used to perform access control or security isolation between the VNF and an associated network element. The associated network element is a network element other than the VNF in a network to which the VNF belongs.

Optionally, the processor 601 may be further configured to determine a network isolation requirement of the VNF based on a function that needs to be implemented by the VNF, and generate the second security policy that matches the network isolation requirement of the VNF; or determine an access control requirement of the VNF based on a function that needs to be implemented by the VNF, and generate the second security policy that matches the access control requirement.

Optionally, the communications interface 603 may be further configured to: send, by using a VIM, the second security policy to a gateway device configured to provide the VNF with a network service; or send the second security policy to a gateway device by using an EMS.

In specific implementation, this application further provides a computer storage medium, and the computer storage medium may store a program. When the program runs, a part or all of the steps in the embodiments of the security policy configuration method provided in this application may be performed. The storage medium may include a magnetic disk, an optical disc, a read-only memory (ROM), or a random access memory (RAM).

A person skilled in the art may clearly understand that, the technologies in the embodiments of this application may be implemented by software in addition to a necessary general hardware platform. Based on such an understanding, the technical solutions of this application essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of this application.

For same or similar parts in the embodiments in this specification, mutual reference may be made to these embodiments. Particularly, embodiments of the security policy configuration apparatus and the management network element are similar to a method embodiment, and therefore are described briefly. For related parts, refer to descriptions in the method embodiment.

The foregoing descriptions are implementations of this application, but are not intended to limit the protection scope of this application.

What is claimed is:

1. A security policy deployment method comprising:
monitoring, by a management network element (MME), a lifecycle state of a virtualized network function (VNF), including obtaining configuration information of the VNF indicating a change of the lifecycle state of the VNF after the VNF is instantiated or created and before the VNF is terminated;
in response to the change of the lifecycle state of the VNF comprising a change of one or more components of the VNF;
generating, by the MME, a first security policy of the VNF, wherein the first security policy comprises a first network isolation policy and a first access control policy, wherein the first network isolation policy indicates network isolation between components in the VNF, and wherein the first access control policy is used to perform access control on an access request whose access target is a component in the VNF;
sending, by the MME, the first security policy to the VNF;
in response to the change of the lifecycle state of the VNF comprising a change of an object served by the VNF;
generating, by the MME, a second security policy of the VNF, wherein the second security policy comprises a second network isolation policy and a second access control policy, wherein the second network isolation policy indicates network isolation between the VNF and other VNFs, and wherein the second access control policy is used to perform access control on an access request whose access target is the VNF; and
sending, by the MME, the second security policy to a gateway device.

2. The method according to claim 1, wherein sending, by the MME, the first security policy to the VNF comprises:
sending, by the MME, the first security policy to the VNF by using a virtualized infrastructure manager (VIM) or an element management system (EMS).

3. The method according to claim 1, wherein sending, by the MME, the second security policy to the gateway device comprises:
sending, by the MME, the second security policy to the gateway device by using a virtualized infrastructure manager (VIM) or an element management system (EMS).

4. A security policy deployment apparatus comprising a transmitter, and a processor which is configured to:
monitor, a lifecycle state of a virtualized network function (VNF), including obtaining configuration information of the VNF indicating a change of the lifecycle state of the VNF after the VNF is instantiated or created and before the VNF is terminated;
in response to the change of the lifecycle state of the VNF comprising a change of component of the VNF;
generate a first security policy of the VNF, wherein the first security policy comprises a first network isolation policy and a first access control policy, wherein the first network isolation policy indicates network isolation between components in the VNF, and wherein the first access control policy is used to perform access control on an access request whose access target is a component in the VNF;
send the first security policy to the VNF;
in response to the change of the lifecycle state of the VNF comprising a change of an object served by the VNF;
generate a second security policy of the VNF, wherein the second security policy comprises a second network isolation policy and a second access control policy, wherein the second network isolation policy indicates network isolation between the VNF and other VNFs, and wherein the second access control policy is used to perform access control on an access request whose access target is the VNF; and
send the second security policy to a gateway device.

5. The apparatus according to claim 4, wherein the transmitter is further configured to cooperate with the processor to send the first security policy to the VNF by using a virtualized infrastructure manager (VIM) or an element management system (EMS).

6. The apparatus according to claim 4, wherein the transmitter is further configured to:
cooperate with the processor to send, by using a virtualized infrastructure manager (VIM) or an element management system (EMS), the second security policy to the gateway device, which is configured to provide the VNF with a network service.

7. A non-transitory, computer-readable medium having processor-executable instructions stored thereon, which when executed by a processor of a management network element (MME), cause the processor to implement a security policy deployment method including the following operations:
monitoring a lifecycle state of a virtualized network function (VNF), including obtaining configuration information of the VNF indicating a change of the lifecycle state of the VNF after the VNF is instantiated or created and before the VNF is terminated;
in response to the change of the lifecycle state of the VNF comprising a change of component of the VNF;
generating a first security policy of the VNF, wherein the first security policy comprises a first network isolation policy and a first access control policy, wherein the first network isolation policy indicates network isolation between components in the VNF, and wherein the first access control policy is used to perform access control on an access request whose access target is a component in the VNF;
sending the first security policy to the VNF;
in response to the change of the lifecycle state of the VNF comprising a change of an object served by the VNF;
generating a second security policy of the VNF, wherein the second security policy comprises a second network isolation policy and a second access control policy, wherein the second network isolation policy indicates network isolation between the VNF and other VNFs, and wherein the second access control policy is used to perform access control on an access request whose access target is the VNF; and
sending, the second security policy to a gateway device.

8. The non-transitory, computer-readable medium according to claim 7, wherein sending the first security policy to the VNF comprises:
   sending the first security policy to the VNF by using a virtualized infrastructure manager (VIM) or an element management system (EMS).

9. The non-transitory, computer-readable medium according to claim 7, wherein sending the second security policy to the gateway device comprises:
   sending the second security policy to the gateway device by using a virtualized infrastructure manager (VIM) or an element management system (EMS).

* * * * *